US009092655B2

(12) United States Patent
Uno et al.

(10) Patent No.: US 9,092,655 B2
(45) Date of Patent: Jul. 28, 2015

(54) BIOMETRIC AUTHENTICATION DEVICE

(71) Applicant: FUJITSU LIMITED, Kawasaki-shi, Kanagawa (JP)

(72) Inventors: Kazuya Uno, Yokohama (JP); Yukihiro Abiko, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 13/927,922

(22) Filed: Jun. 26, 2013

(65) Prior Publication Data
US 2014/0016839 A1   Jan. 16, 2014

Related U.S. Application Data

(63) Continuation of application No. PCT/JP2010/073634, filed on Dec. 27, 2010.

(51) Int. Cl.
*G06K 9/00* (2006.01)
*G06K 9/68* (2006.01)
*G06F 21/00* (2013.01)

(52) U.S. Cl.
CPC .......... *G06K 9/0008* (2013.01); *G06K 9/00087* (2013.01); *G06K 9/00926* (2013.01); *G06K 9/6807* (2013.01)

(58) Field of Classification Search
CPC ....................................................... G06K 9/00
USPC .................... 382/115, 116, 124, 125; 283/68; 713/155, 161, 176, 186
See application file for complete search history.

(56) References Cited

U.S. PATENT DOCUMENTS

| 6,047,079 | A   | * | 4/2000 | Uchida .......................... | 382/124 |
| 8,472,679 | B2  | * | 6/2013 | Abiko et al. ................... | 382/115 |
| 2006/0018523 | A1 | * | 1/2006 | Saitoh et al. ................... | 382/124 |

FOREIGN PATENT DOCUMENTS

| JP | 10-187970 | 7/1998 |
| JP | 2003-337949 | 11/2003 |
| JP | 2005-301348 | 10/2005 |

(Continued)

OTHER PUBLICATIONS

International Search Report mailed Jan. 25, 2011 for corresponding International Application No. PCT/JP2010/073634.

(Continued)

*Primary Examiner* — Abolfazl Tabatabai
(74) *Attorney, Agent, or Firm* — Staas & Halsey LLP

(57) ABSTRACT

A biometric authentication device, inputs biometric information such as a fingerprint, extracts feature information included in the biometric information, calculates the degree of reliability of the biometric information on the basis of the feature information, obtains a classification of the biometric information on the basis of the feature information, calculates the degree of reliability of the obtained classification, determines whether or not to execute an identification process between the input biometric information and biometric information enrolled in a storage unit on the basis of the degree of reliability of the biometric information and of classification, further determines whether or not a re-input process of the biometric information is needed, executes an identification process for the biometric information when it is determined that the identification process is needed, and issues a re-input instruction for the biometric information when it is determined that the re-input process is needed.

20 Claims, 16 Drawing Sheets

(56) References Cited

FOREIGN PATENT DOCUMENTS

| JP | 2006-72429 | 3/2006 |
| WO | 2011/121674 | 10/2011 |

OTHER PUBLICATIONS

PCT International Preliminary Report on Patentability issued Jul. 2, 2013 in corresponding International Application No. PCT/JP2010/073634.

* cited by examiner

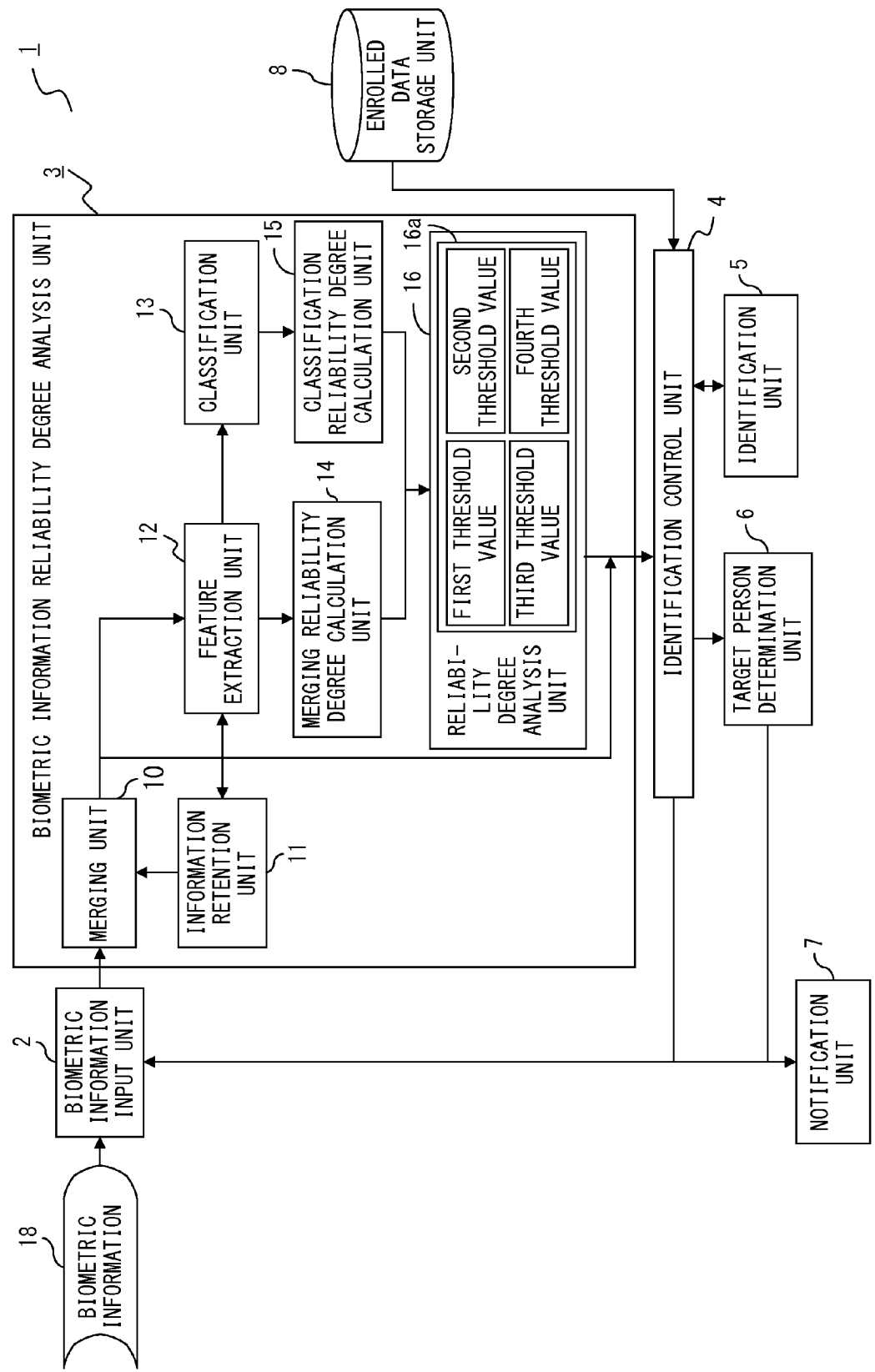
F I G. 1

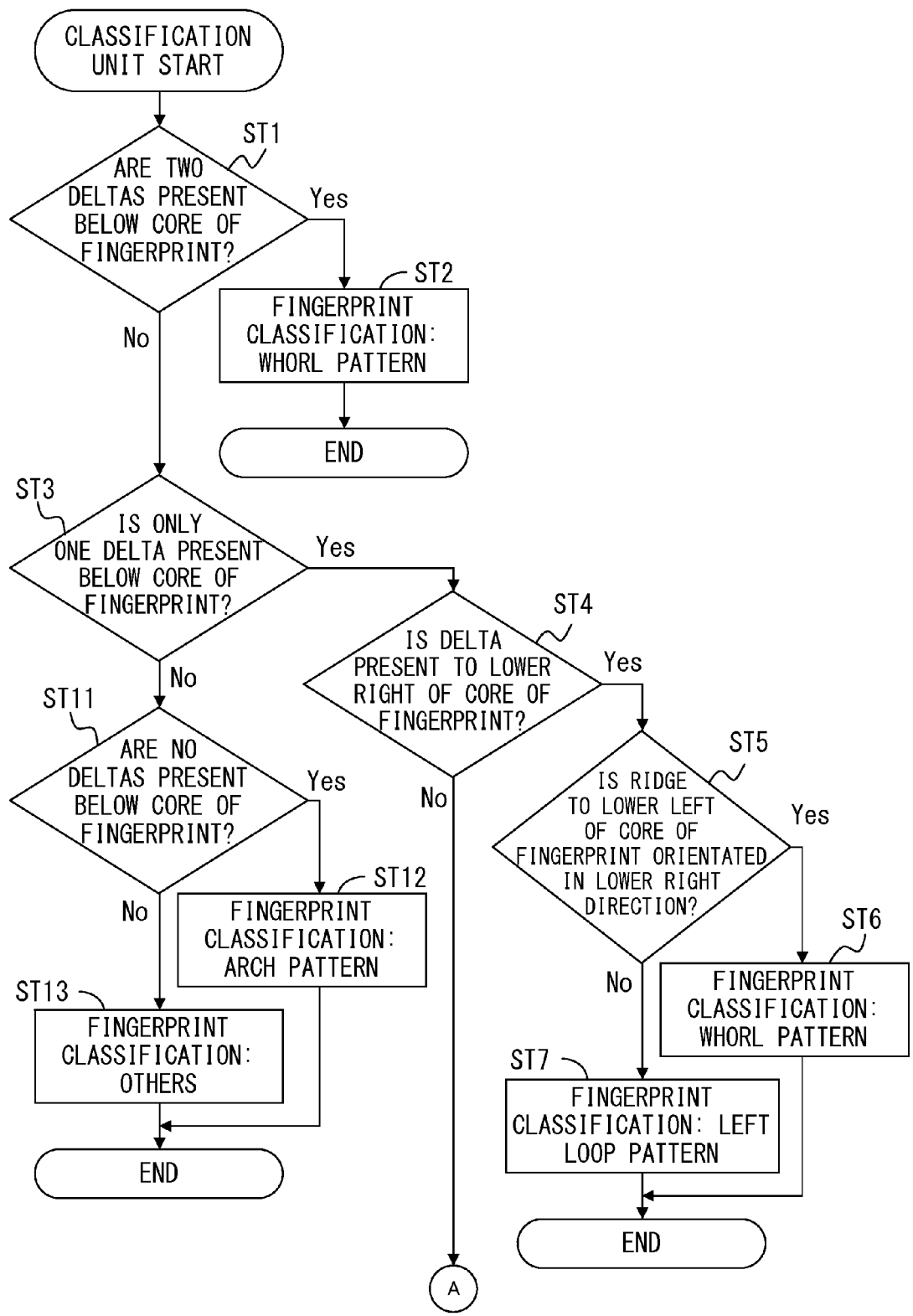
F I G. 2 A

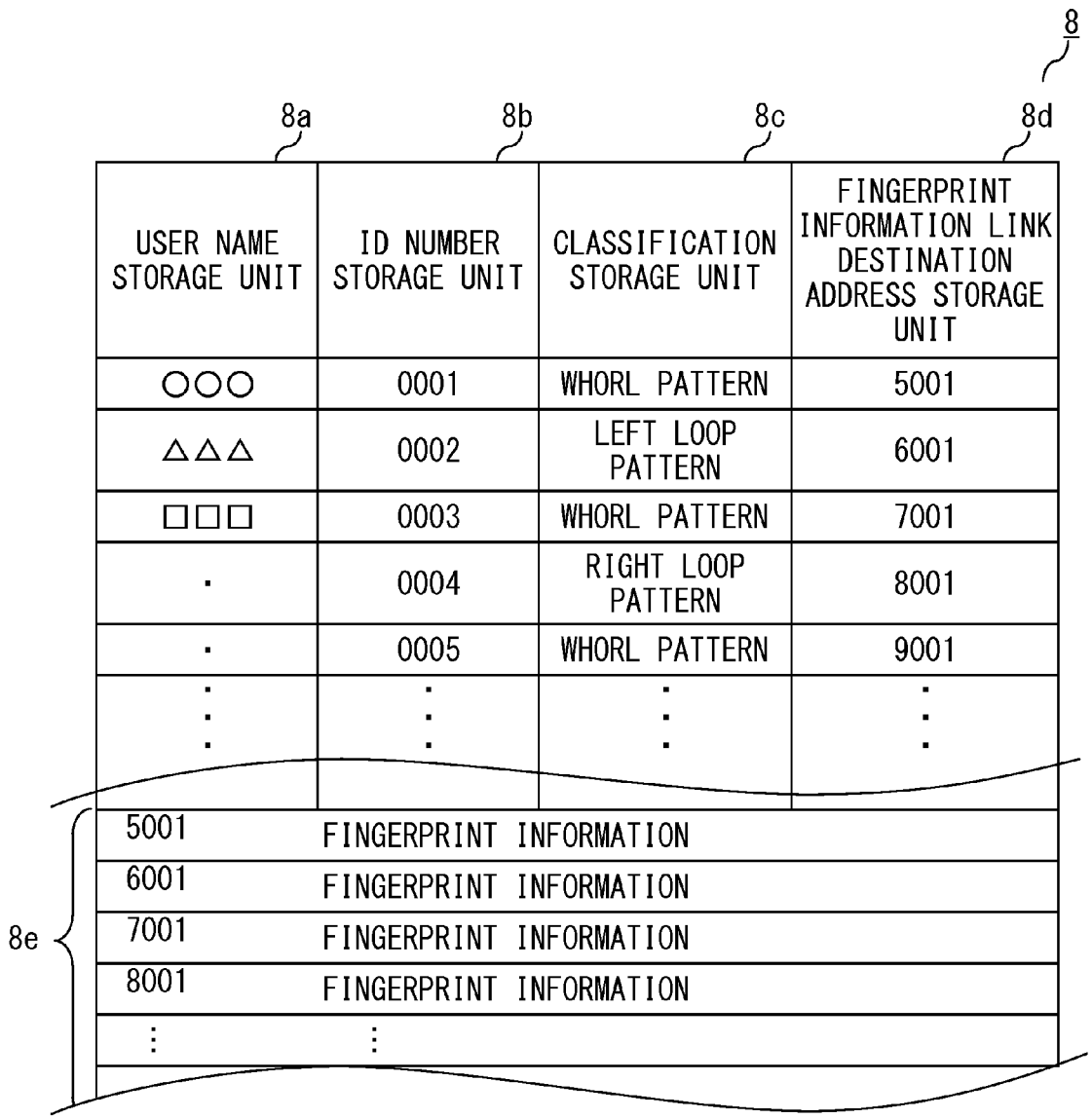
F I G. 3

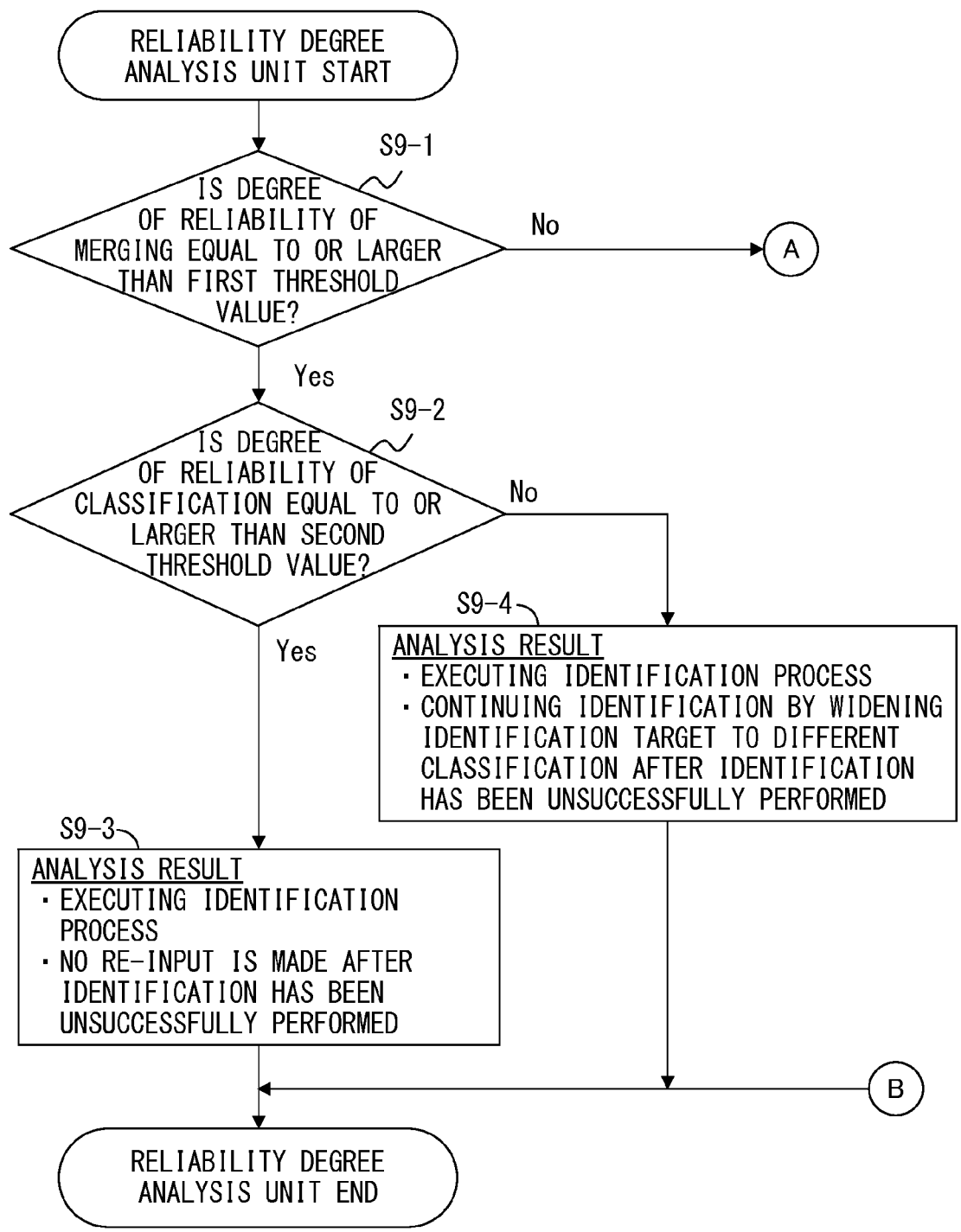
F I G. 6 A

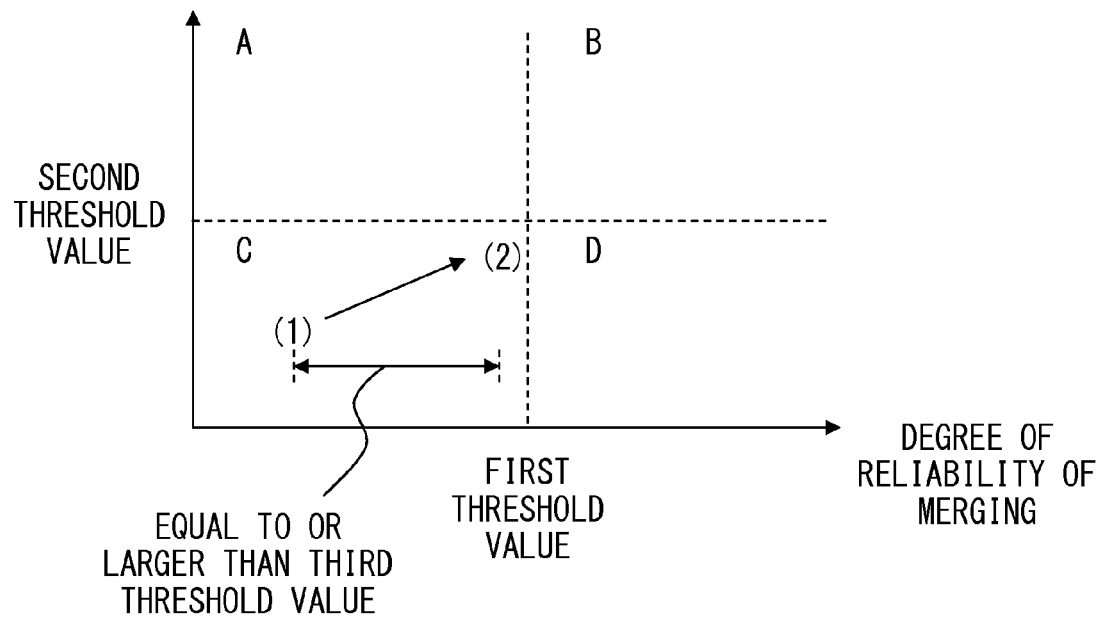
F I G. 9

BIOMETRIC AUTHENTICATION DEVICE

TECHNICAL FIELD

The present invention relates to a biometric authentication device for performing personal authentication on the basis of biometric information.

BACKGROUND ART

Nowadays, biometric authentication devices for performing personal authentication by using biometric information such as a fingerprint, a vein, an iris of an eyeball, or the like are widely used. Such biometric authentication devices are broadly classified as either a one-to-one method or a one-to-N method on the basis of the number of pieces of enrolled data to be compared. The one-to-one method is a method for using another personal identification means in addition to biometric information when personal authentication is performed. The personal authentication is performed, for example, by also using an input of a user ID, an input of identification information from an IC card, or the like. In contrast, the one-to-N method is a method for performing personal authentication by using only biometric information.

With the above described one-to-N method, the personal authentication is performed on the basis of a determination threshold value for a preset degree of similarity of biometric information. Namely, the personal authentication is performed by comparing, with the above described determination threshold value, the degree of similarity obtained by making a comparison between biometric information obtained from a user and preregistered biometric information. As described above, the one-to-N method is very convenient for users since an input of information other than biometric information is not needed. However, the one-to-N method needs a process for a comparison of the degree of similarity for all pieces of registered biometric information to be identified. Accordingly, a load imposed on a biometric authentication device is high, and also the length of time needed for the personal authentication increases.

Therefore, a process is executed for reducing the number of pieces of biometric information, for which the personal authentication is to be performed, by executing a classification process for input biometric information before the process for the comparison with registered biometric information to be identified is executed. For example, if the biometric information is a fingerprint, the fingerprint is classified on the basis of input fingerprint information, and an identification target is narrowed down. By narrowing down an identification target in this way, the number of pieces of biometric information for which the identification process is to be executed is reduced, thereby lightening the load imposed on the biometric authentication device. However, attempting to narrow down the identification target sometimes fails. In this case, a binning error occurs such that the identification target is narrowed down as a classification that does not include biometric information of the target person.

Accordingly, an invention is disclosed for reducing occurrences of a binning error by putting a physiological feature into an index on the basis of biometric information such as an obtained fingerprint or the like, by classifying, for example, the number of end points of the fingerprint and the number of bifurcation points of the fingerprint respectively as index values, and by registering target fingerprint information to both classifications when a classification based on the fingerprint information when being registered is in a boundary area (Patent Document 1).

Additionally, an invention is disclosed for executing an identification process by targeting fingerprint information of all classifications if the degree of certainty of an obtained classification class is low in a method for narrowing down an identification target on the basis of a fingerprint classification (Patent Document 2).

Furthermore, an invention is disclosed for creating a fingerprint image that increases the amount of information, such as of a minutia or the like, and that enables a successful matching to be made by prompting a re-input of fingerprint information and by executing a process for merging with the re-input fingerprint information when the quality of obtained fingerprint information is low (Patent Document 3).

RELATED ART DOCUMENTS

Patent Documents

Patent Document 1: Japanese Laid-open Patent Publication No. 2006-72429
Patent Document 2: Japanese Laid-open Patent Publication No. 10-187970
Patent Document 3: Japanese Laid-open Patent Publication No. 2005-301348

SUMMARY OF THE INVENTION

Problems to be Solved by the Invention

The above described inventions according to Patent Documents 1 and 2 do not take into account a case where an input state of biometric information is unsatisfactory, and have a high possibility that personal authentication will be unsuccessfully performed.

Additionally, the above described invention according to Patent Document 2 executes an identification process by widening a classification range. However, repeating the identification process by widening a classification range even when a classification is properly selected from the beginning poses a problem such that a different person may be erroneously authenticated as a target person. In the meantime, with the invention according to Patent Document 3, a user repeats a re-input process of biometric information, leading to an increase in a load imposed on the biometric authentication device.

Accordingly, a biometric authentication device is provided for reducing the possibility that a different person will be erroneously authenticated as a target person due to an identification process being repeatedly executed by widening a classification range, for reducing an unnecessary re-input process when an input state of biometric information is satisfactory, and for lightening a load imposed on the biometric authentication device.

Means for Solving the Problems

A biometric authentication device extracts feature information of biometric information such as a fingerprint or the like input from a biometric information input unit with the use of a feature extraction unit, and calculates the degree of reliability of merging and the degree of reliability of classification of the biometric information on the basis of the feature information. For example, if the degree of reliability of merging is equal to or larger than a specified threshold value and the degree of reliability of classification is smaller than a specified threshold value, an unnecessary re-inputting of the biometric information is not performed, and an identification process for performing matching with biometric information of a different classification that does not belong to the classification obtained by the classification unit is executed to avoid a binning error. Conversely, if the degree of reliability of merging is smaller than the specified threshold value and the degree of reliability of classification is equal to or larger than the specified threshold value, the possibility that a different person will be erroneously identified as a target person is reduced without executing an unnecessary identification process for performing matching with biometric information of a different classification, and a re-input process of the biometric information is executed to improve the probability of successful personal authentication.

Additionally, when the identification process is executed, the identification process is executed by reading corresponding biometric information, stored in a storage unit, of a classification. When the identification process is executed by widening a classification range, biometric information belonging to a different classification is read to execute the identification process. Moreover, when a re-input process of biometric information is executed, an instruction to re-input the biometric information is issued from a notification unit to a user.

Effects of the Invention

The disclosed biometric authentication device can reduce the possibility that a different person will be erroneously authenticated as a target person without executing an identification process for performing matching with biometric information of a different classification when the degree of reliability of classification is high, can lighten a load imposed on the biometric authentication device without requiring a user to re-input unnecessary biometric information when the degree of reliability of merging is high, and can avoid a binning error by executing an identification process for performing matching with biometric information of a different classification if the degree of reliability of classification is low.

BRIEF DESCRIPTION OF DRAWINGS

FIG. 1 is an explanatory diagram of a biometric authentication device according to an embodiment;

FIGS. 2A and 2B provide a flowchart for explaining a fingerprint classification process executed by a classification unit;

FIG. 3 illustrates one example of a registration data storage unit;

FIGS. 6A, 6B and 6C provide a flowchart for explaining a reliability degree analysis process;

FIG. 9 illustrates an example where the degree of reliability of merging changes when a re-input instruction is issued and the degree of reliability of merging is improved;

BEST MODE FOR CARRYING OUT THE INVENTION

Figure 2B:
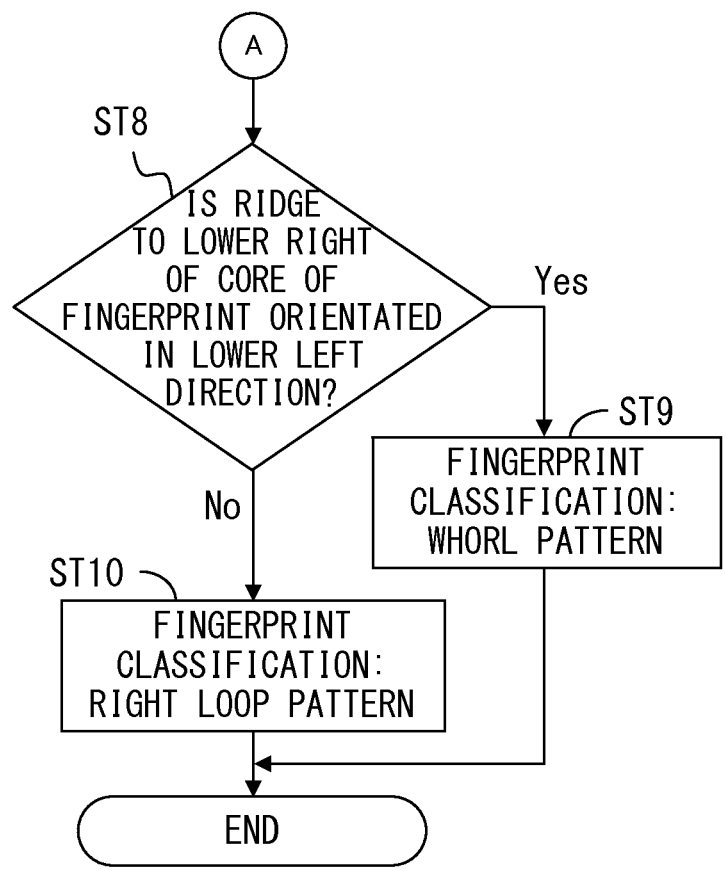

An embodiment according to the present invention is described below with reference to the drawings. This embodiment is described by assuming that fingerprint information is used as biometric information when personal authentication is performed.

FIG. 1 is a block diagram for explaining a biometric authentication device according to this embodiment. The biometric authentication device 1 according to this embodiment includes a biometric information input unit 2, a biometric information reliability degree analysis unit 3, an identification control unit 4, an identification unit 5, a target person determination unit 6, a notification unit 7, and a registration data storage unit 8.

The biometric information input unit 2 is a fingerprint sensor. To the biometric information input unit 2, fingerprint information is input as biometric information 18 of a user. As the fingerprint sensor, various types of fingerprint sensors can be used such as for example a CCD (Charge Coupled Device) sensor provided with a glass surface on which a finger of a user is placed, for reading a pattern of a fingerprint by irradiating light and by converting a largeness and smallness of the amount of reflected light into an electric signal, or a capacitance semiconductor sensor provided with a protection film of electrodes on which a finger is placed, for reading a pattern of a fingerprint by detecting the amount of charge that varies in accordance with concavity and convexity of the fingerprint.

The biometric information reliability degree analysis unit 3 includes a merging unit 10, an information retention unit 11, a feature extraction unit 12, a classification unit 13, a merging reliability degree calculation unit 14, a classification reliability degree calculation unit 15, and a reliability degree analysis unit 16. The information retention unit 11 retains fingerprint information input from the biometric information input unit 2, and also retains feature information extracted by the feature extraction unit 12.

The merging unit 10 executes a process for merging new fingerprint information input from the biometric information input unit 2 and the fingerprint information retained in the information retention unit 11. For example, the merging unit 10 executes an OR merging process for both of the fingerprint information, or executes an OR merging process implemented by assigning a specified weight to the information of either of the fingerprints. The information retained in the information retention unit 11 is previous biometric information and features information of a user who newly inputs fingerprint information to the biometric information input unit 2. The merging unit 10 merges the retained information and fingerprint information of the same user. When a user inputs first fingerprint information, the above described merging process is not executed, and the fingerprint information input from the biometric information input unit 2 is directly transmitted to the feature extraction unit 12.

The fingerprint information merged by the merging unit 10, or the first fingerprint information input from the biometric information input unit 2, is transmitted to the feature extraction unit 12, which then extracts minutiae of the fingerprint. For example, minutiae such as an end point where a ridge ends, a bifurcation point where a ridge diverges into two lines, a central point of a pattern of the fingerprint, and a position of a delta where ridges in three directions join are extracted, and relationships among these points are extracted as feature information.

The classification unit 13 classifies the fingerprint on the basis of the feature information extracted by the feature extraction unit 12. The fingerprint is classified, for example, on the basis of the central point, the position of the delta, the direction of the ridge, and the like. FIG. 2 is a flowchart for specifically explaining this fingerprint classification process.

Initially, whether or not two deltas are present below the core of a fingerprint is determined on the basis of information of the number and positions of deltas of the fingerprint (step (hereinafter abbreviated to ST) 1). Here, if two deltas are present below the core of the fingerprint ("YES" in ST1), it is determined that a fingerprint classification is a whorl pattern (ST2).

In contrast, if two deltas are not present below the core of the fingerprint ("NO" in ST1) and only one delta is present below the core of the fingerprint ("YES" in ST3), this delta is present to the lower right of the core of the fingerprint ("YES" in ST4), and a ridge to the lower left of the core of the fingerprint is orientated to the lower right ("YES" in ST5), it is determined that the fingerprint classification is the whorl pattern also in this case (ST6).

Alternatively, if no deltas are present to the lower right of the core of the fingerprint ("NO" in ST4) and the ridge to the lower right of the core of the fingerprint is oriented in the downward-left direction ("YES" in ST8), it is determined that the fingerprint classification is the whorl pattern also in this case (ST9).

Further alternatively, if only one delta is present below the core of the fingerprint ("YES" in ST3), this delta is present to the lower right of the core of the fingerprint ("YES" in ST4), and the ridge to the lower left of the core of the fingerprint is not orientated to the lower right ("NO" in ST5), it is determined that the fingerprint classification is a left loop pattern (ST7). Alternatively, if only one delta is present below the core of the fingerprint ("YES" in ST3), this delta is not present to the lower right of the core of the fingerprint ("NO" in ST4), and the ridge to the lower right of the core of the fingerprint is not orientated oriented in the downward left direction ("NO" in ST8), it is determined that the fingerprint classification is a right loop pattern (ST10).

Moreover, if no deltas are present below the core of the fingerprint ("YES" in ST11), it is determined that the fingerprint classification is an arch pattern (ST12). If the above described conditions are not satisfied ("NO" in ST11), such as in a case where three or more deltas are present below the core of the fingerprint or in a case where a delta is present in a portion not below the core of the fingerprint, it is determined that the fingerprint is a different fingerprint classification (ST13).

In the meantime, the merging reliability degree calculation unit 14 calculates the degree of reliability of merging (Re_S) on the basis of the feature information extracted by the feature extraction unit 12. The degree of reliability of merging (Re_S) is calculated on the basis of the following calculation formula.

$$Re\_S = f(A, F, S) \quad (1)$$

In the equation (1), A indicates an area of a fingerprint that enables an image of a specified quality or higher to be obtained, F indicates the number of pieces of the above described feature information, and S indicates singularity information. Even when first fingerprint information for which the merging process is not executed is input, the process executed by the merging reliability degree calculation unit 14 is referred to as a merging reliability degree calculation process for convenience of explanation.

Here, the above-described quality is decided in accordance with a sharpness of an input image and the magnitude of noise in feature information. For example, if there is a portion where a ridge is blurred by sweat, an excessive force, or the like, it is determined that the direction of the ridge is not sharp and the noise is high. Accordingly, the area A of a fingerprint that enables an image having the above described specified quality or higher to be obtained is an area where the sharpness of the input image and the magnitude of the noise of the feature information are secured at a certain level or higher. For example, numerical values corresponding to areas are prestored in a table, and a numerical value corresponding to the area where the quality at the certain level or higher is secured is read from the table and used for the above described calculation.

Additionally, the number of pieces of feature information F is the number of pieces of information such as the above described end point and bifurcation point of a ridge, the central point of a fingerprint pattern, and the like, and this is also the number of pieces of feature information that is at the minimum level available for the identification process. For example, a table where numerical values corresponding to the number of pieces of the feature information are stored is created, and a corresponding numerical value is read from this table and used for the above described calculation.

Furthermore, the singularity information S among the feature information is information for deciding the central position of a fingerprint, and is, for example, information of the central position of a fingerprint, a position of a delta, and the number of deltas. These pieces of singularity information are singularity information that are at the minimum level available for the identification process, similarly as described above. A table is created where numerical values to which a weight corresponding to singularity information is assigned are stored, and a corresponding value is read from this table and used for the above described calculation.

A calculation formula of the singularity information S obtained by assigning a weight to the number of pieces of obtained singularity information in accordance with a difference in the degree of importance of the feature information is as follows.

$$S = w2 \times Sn$$

In this equation, w2 is the value of a weight in accordance with feature information and is a value larger than 1, and Sn represents the number of pieces of singularity information.

Information of the degree of reliability of merging calculated by the above described merging reliability degree calculation unit 14 is transmitted to the reliability degree analysis unit 16.

In the meantime, the classification reliability degree calculation unit 15 calculates the degree of reliability of classification (Re_B) that indicates the reliability of a result of fingerprint classification performed by the classification unit 13. The degree of reliability of classification (Re_B) is calculated on the basis of the following calculation formula.

$$Re\_B = g(C, S', R) \quad (2)$$

In the equation (2), C indicates a fingerprint classification given by the classification unit 13, S' indicates classification singularity information, and R indicates information of the shape of a ridge in the vicinity of a singularity or the presence or absence of a singularity.

Here, the above described classification singularity information S' is decided in accordance with an association with a fingerprint classification C, and is decided on the basis of the degree of matching with a singularity sequence of the fingerprint classification C.

Moreover, also the information R of the shape of the ridge in the vicinity of a singularity or the presence or absence of a singularity is stored, for example, in a table on the basis of pre-calculated data, and a corresponding numerical value is read from this table and used for the above described calculation. Note that a weight is assigned also to this R in the association with the fingerprint classification C when a numerical value is set in the above described table.

The reliability degree analysis unit 16 analyzes fingerprint information to be identified on the basis of a calculation result of the degree of reliability of merging calculated by the merging reliability degree calculation unit 14 and that of the degree of reliability of classification calculated by the classification reliability degree calculation unit 15, analyzes whether or not to execute an identification process, and also analyzes whether or not a re-inputting of fingerprint information is needed. The reliability degree analysis unit 16 includes a storage unit 16a, which stores first to fourth threshold values to be described later.

When the identification control unit 4 receives an analysis result obtained by the reliability degree analysis unit 16 and obtains an analysis result indicating that an identification process is needed, the identification control unit 4 instructs the identification unit 5 to execute the identification process. Moreover, the identification control unit 4 receives an identification result obtained by the identification unit 5 from the identification unit 5, and transmits the result to the target person determination unit 6.

Additionally, when the identification control unit 4 obtains an analysis result that is obtained by the reliability degree analysis unit 16 and indicates that a re-input is needed, the identification control unit 4 issues a re-input instruction for the fingerprint information to the biometric information input unit 2 and the notification unit 7. Moreover, the notification unit 7 notifies a user of the re-input instruction for the fingerprint information.

The identification unit 5 compares the degree of similarly between fingerprint information after being merged, which is provided from the merging unit 10 via the identification control unit 4, and registration data registered to the registration data storage unit 8. When a user inputs the first fingerprint information, the fingerprint information is input to the identification unit 5 via the identification control unit 4 without executing the merging process by the merging unit 10, and the degree of similarly between the input fingerprint information and fingerprint information registered to the registration data storage unit 8 is compared.

In the registration data storage unit 8, for example, a user name, an ID number, a fingerprint classification and fingerprint information of a user are associated with one another and stored. FIG. 3 illustrates one example of the registration data storage unit 8. In FIG. 3, the registration data storage unit 8, for example in the form of a table, includes storage areas such as a user name storage unit 8a, an ID number storage unit 8b, a classification storage unit 8c, and a fingerprint information link destination address storage unit 8d. Moreover, fingerprint information of a user is registered to a registration area 8e, and an address of the registration area 8e, to which corresponding fingerprint information of a user is registered, is stored in the link destination address storage unit 8d.

By way of example, for a user "∘∘∘", "∘∘∘" is stored in the user name storage unit 8a, "0001" is stored in the ID number storage unit 8b, a fingerprint classification, for example a "whorl pattern", is stored in the classification storage unit 8c, and an address "5001" to which corresponding fingerprint information of the user is registered is stored in the link destination address storage unit 8d.

Additionally, by way of example, for a user "ΔΔΔ", "ΔΔΔ" is stored in the user name storage unit 8a, "0002" is stored in the ID number storage unit 8b, a fingerprint classification, for example a "left loop pattern", is stored in the classification storage unit 8c, and an address "6001" to which corresponding fingerprint information of the user is registered is stored in the link destination address storage unit 8d. Moreover, for a user "□□□", "□□□" is stored in the user name storage unit 8a, "0003" is stored in the ID number storage unit 8b, a fingerprint classification, for example a "whorl pattern", is stored in the classification storage unit 8c, and an address "7001" to which corresponding fingerprint information of the user is registered is stored in the link destination address storage unit 8d.

Subsequent registration data are as illustrated in FIG. 3. For a user having an ID number "0004", a fingerprint classification, for example a "right loop pattern", is stored in the classification storage unit 8c, and for a user having an ID number "0005", a fingerprint classification, for example a "whorl pattern", is stored in the classification storage unit 8c.

The identification control unit 4 reads fingerprint information included in a corresponding fingerprint classification from the registration data storage unit 8, and transmits the read fingerprint information to the identification unit 5, which then executes an identification process for performing matching with the input fingerprint information. Namely, the identification unit 5 reads the fingerprint information included in the fingerprint classification, such as a "whorl pattern", selected by the classification unit 13, and compares the degree of similarity between the read fingerprint information and the input fingerprint information. The target person determination unit 6 determines that personal authentication has been successfully performed if the identification process by the identification unit 5 was successfully executed, and notifies the notification unit 7 that the personal authentication has been successfully performed.

The notification unit 7 has, for example, a liquid crystal display screen, and displays various items of information for a user who requests the personal authentication. Moreover, the notification unit 7 may have a function of reporting an authentication result of another device, for example with an operation system (OS) or an application (APL) within the biometric authentication device 1. In this case, information such as a result of the personal authentication, a re-input instruction, or the like can be reported via a network to a device such as a personal computer (PC), a PDA (Personal Digital Assistant) or the like connected to the biometric authentication device according to this embodiment.

Process operations of this embodiment in the above described configuration are described below.

Figure 4A:
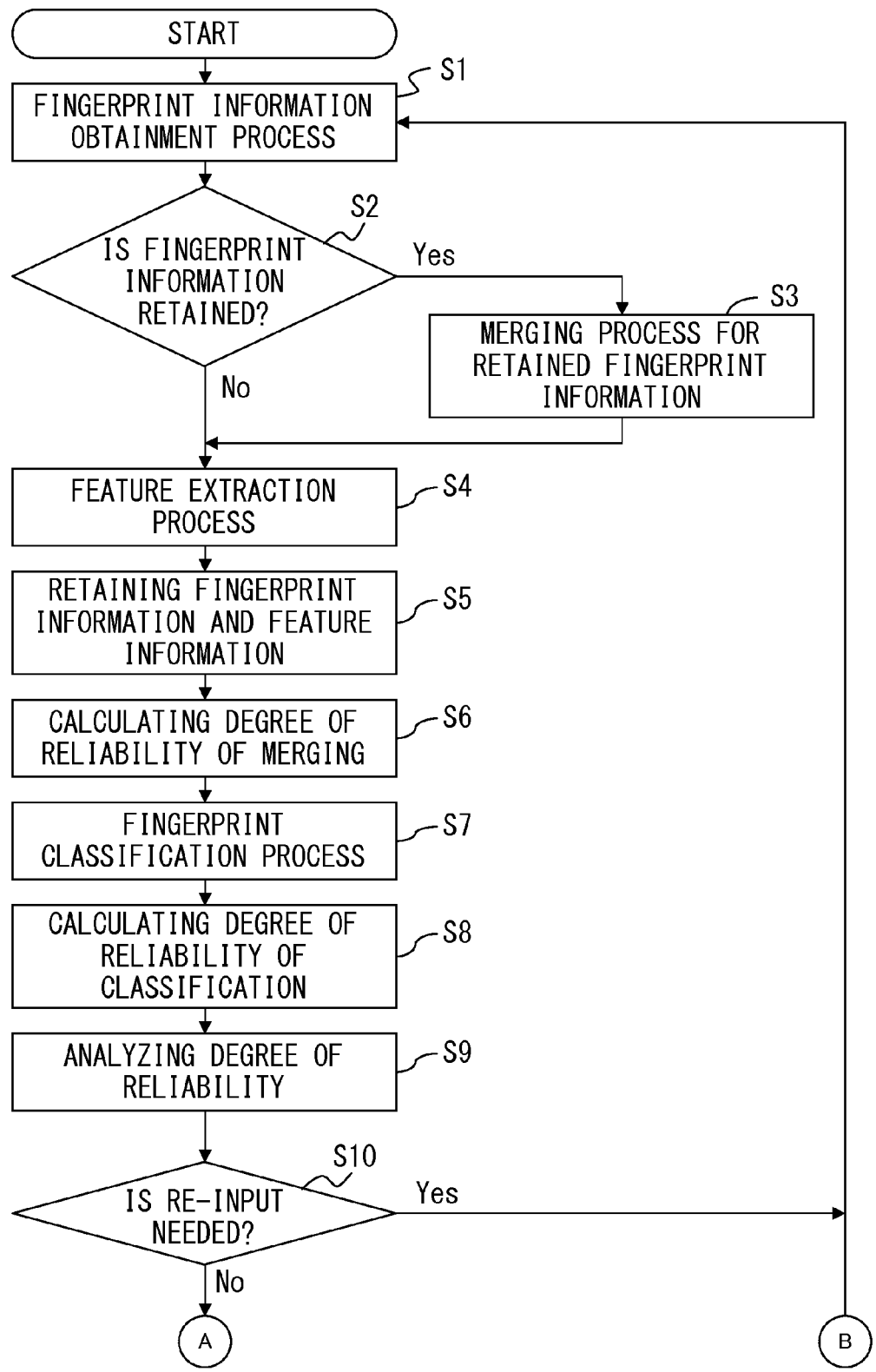
FIGS. 4A and 4B provide a flowchart for explaining process operations according to the embodiment.
Figure 4B:
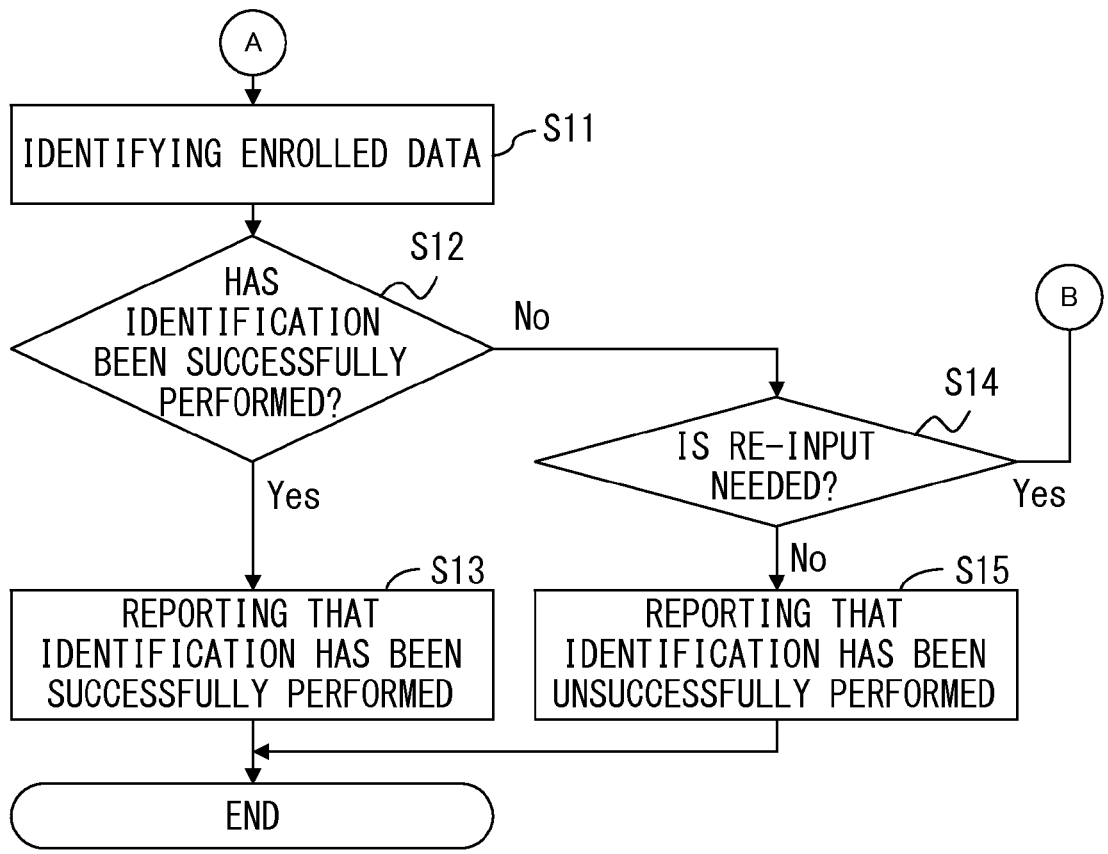

FIG. 4 is a flowchart for explaining the process operations of this embodiment. Initially, a processor, not illustrated, of the biometric authentication device 1 obtains fingerprint information as the biometric information 18 of a user (step (hereinafter abbreviated to S) 1). For example, if the user places his or her finger on a glass surface of a fingerprint sensor, which is the biometric information input unit 2, the biometric information input unit 2 detects that the finger has been placed on the sensor, and reads fingerprint information of the user.

Next, whether or not fingerprint information is retained in the information retention unit 11 is determined (S2). This determination is to determine whether or not previous fingerprint information of the same user or fingerprint information being merged before is retained in the information retention unit 11. Namely, the previous fingerprint information of the same user or the previous fingerprint information being merged before is retained in the information retention unit 11 ("YES" in S2) when a re-input instruction for the fingerprint information is issued from the identification control unit 4. Accordingly, in this case, the fingerprint information retained or the previous fingerprint information being merged before in the information retention unit 11 is merged with the fingerprint information newly input from the biometric information input unit 2 (S3).

In contrast, if the re-input instruction is not issued (for example, this is the first determination), fingerprint information and the like are not retained in the information retention unit 11 ("NO" in S2). Therefore, a feature extraction process of the fingerprint information is executed by the feature extraction unit 12 without the merging process executed by the merging unit 10 (S4).

This feature extraction process is executed by the feature extraction unit 12, and feature information of the fingerprint is extracted from the fingerprint information input from the biometric information input unit 2 or the fingerprint information merged by the merging unit 10. Minutiae such as an end point where a ridge ends, a bifurcation point where a ridge diverges into two lines, a central point of a fingerprint pattern, and a delta where ridges in three directions join are extracted, and relationships among the minutiae are extracted as feature information.

Figure 5:
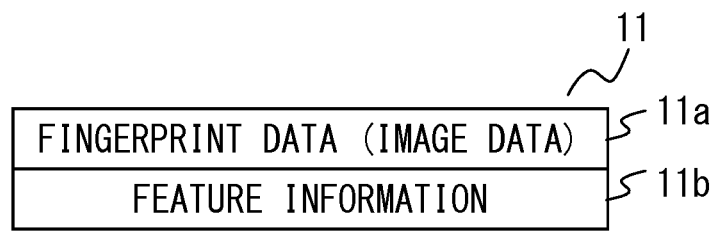
FIG. 5 is an explanatory diagram of one example of a registration data storage unit.

Next, the feature extraction unit 12 transmits the extracted feature information and the fingerprint information to the information retention unit 11. Moreover, the feature extraction unit 12 transmits the feature information to the classification unit 13 and the merging reliability degree calculation unit 14. The information retention unit 11 retains the above described input fingerprint information and feature information (S5). The fingerprint information is retained in the form of image data in a storage area 11a illustrated in FIG. 5, and the feature information is retained in a storage area 11b, for example.

Next, the merging reliability degree calculation unit 14 calculates the degree of reliability of merging on the basis of the feature information transmitted from the feature extraction unit 12 (S6). This calculation of the degree of reliability of merging is calculated on the basis of the above described calculation formula (1), and a result of this calculation is transmitted to the reliability degree analysis unit 16.

Next, the classification unit 13 executes the classification process for the fingerprint (S7). This classification process for the fingerprint is executed as described above with reference to the flowchart of FIG. 2. With this process, the fingerprint of the user is classified, for example, as a whorl pattern, a left loop pattern, a right loop pattern or the like on the basis of the biometric information.

Next, the calculation process of the degree of reliability of classification is executed (S8). This calculation of the degree of reliability of classification is performed on the basis of the above described calculation formula (2), and a result of the calculation of the degree of reliability of classification calculated by the classification reliability degree calculation unit 15 is transmitted to the reliability degree analysis unit 16.

An analysis process of the degree of reliability is executed by the reliability degree analysis unit 16 (S9). This process is executed on the basis of a calculation result of the degree of reliability of merging obtained by the merging reliability degree calculation unit 14, and a calculation result of the degree of reliability of classification obtained by the classification reliability degree calculation unit 15. For example, the reliability degree analysis unit 16 uses a first threshold value for determining whether or not the degree of reliability of merging is satisfactory, and determines whether the calculation result of the degree of reliability of merging transmitted from the merging reliability degree calculation unit 14 is equal to or larger than the above described first threshold value or is smaller than the first threshold value. The reliability degree analysis unit 16 also uses third and fourth threshold values, which will be described later, for determining a change in the degree of reliability of merging.

Additionally, the reliability degree analysis unit 16 uses a second threshold value for determining whether or not the degree of reliability of classification is satisfactory, and determines whether the calculation result of the degree of reliability of classification transmitted from the above described classification reliability degree calculation unit 15 is equal to or larger than the second threshold value or is smaller than the second threshold value. A specific analysis process of the degree of reliability will be described in detail later.

The identification control unit 4 determines whether or not a re-inputting of the fingerprint information is needed on the basis of an analysis result of the degree of reliability obtained by the reliability degree analysis unit 16 (S10). If the re-inputting of the fingerprint information is needed ("YES" in S10), the biometric information input unit 2 again obtains biometric information of the user (S1). In contrast, if the re-inputting of the fingerprint information is not needed ("NO" in S10), the identification control unit 4 instructs the identification unit 5 to execute an identification process for matching the input fingerprint information with the fingerprint information registered to the registration data storage unit 8 (S11).

Next, if it is determined that the identification has been successfully performed as a result of the identification process ("YES" in S12), the identification control unit 4 transmits information indicating that the identification has been successfully performed to the target person determination unit 6, which then notifies the user that the personal authentication has been successfully performed (S13). In contrast, if the identification control unit 4 determines that the identification process has not been successfully performed ("NO" in S12), the identification control unit 4 further determines whether or not a re-inputting of the fingerprint information is needed (S14). If the identification control unit determines that the re-inputting of the fingerprint information is needed ("YES" in S14), the notification unit 7 instructs the user to re-input biometric information, and the biometric information input unit 2 again obtains the biometric information of the user (S1). Alternatively, if the identification control unit 4 determines that the re-inputting is not needed ("NO" in S14), the identification control unit 4 transmits information indicating that the identification has not been successfully performed to the notification unit 7, which then notifies the user that the identification has not been successfully performed (S15).

Figure 6B:
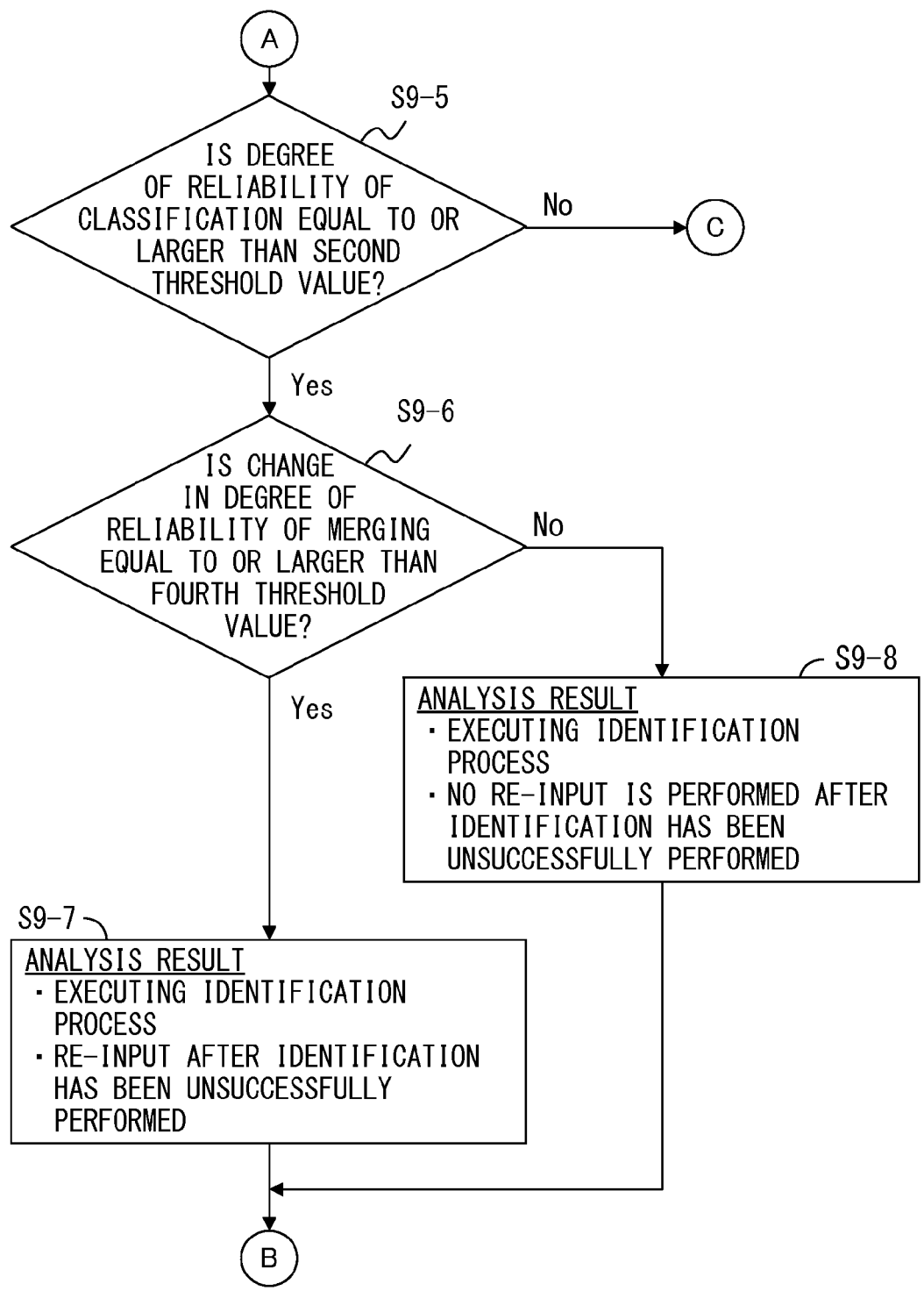
Figure 6C:
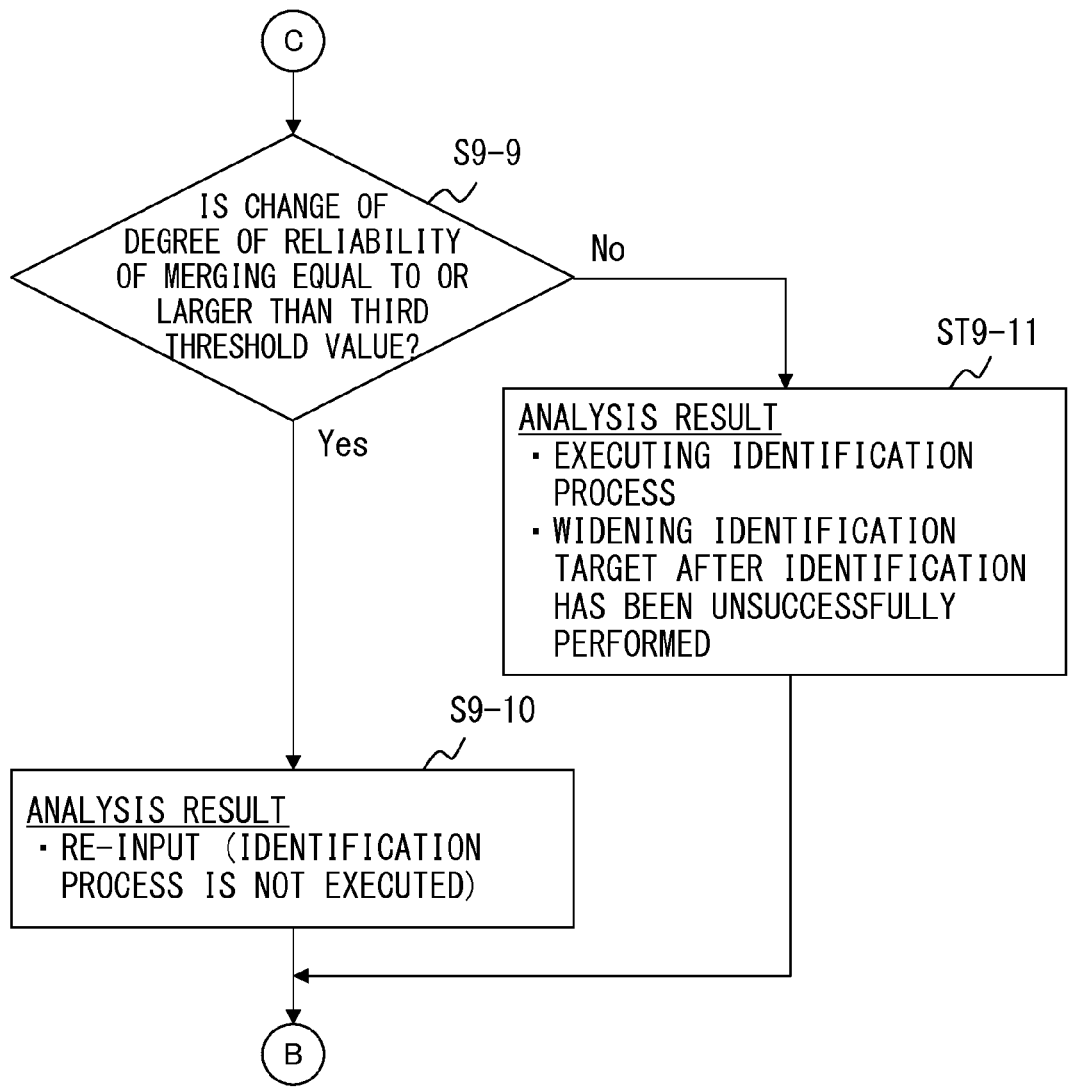

The above-described analysis process of the degree of reliability (S9) executed by the reliability degree analysis unit 16 is described next with reference to a flowchart illustrated in FIG. 6.

As described above, the calculation result of the degree of reliability of merging is input from the merging reliability degree calculation unit 14 to the reliability degree analysis unit 16, and the calculation result of the degree of reliability of classification is input from the classification reliability degree calculation unit 15 to the reliability degree analysis unit 16. A processor not illustrated initially determines whether or not the calculation result of the degree of reliability of merging input from the merging reliability degree calculation unit 14 is equal to or larger than the first threshold value (S9-1). Here, if the calculation result is equal to or larger than the first threshold value ("YES" in S9-1), the processor further determines whether or not the calculation result of the degree of reliability of classification input from the classification reliability degree calculation unit 15 is equal to or larger than the second threshold value (S9-2). Here, if the calculation result of the degree of reliability of classification is also equal to or larger than the second threshold value ("YES" in S9-2), the reliability degree analysis unit 16 transmits an analysis result indicating that a re-inputting of the fingerprint information is not needed to the identification control unit 4 after the identification process has been executed and the identification process has been unsuccessfully executed (S9-3).

Figure 7:
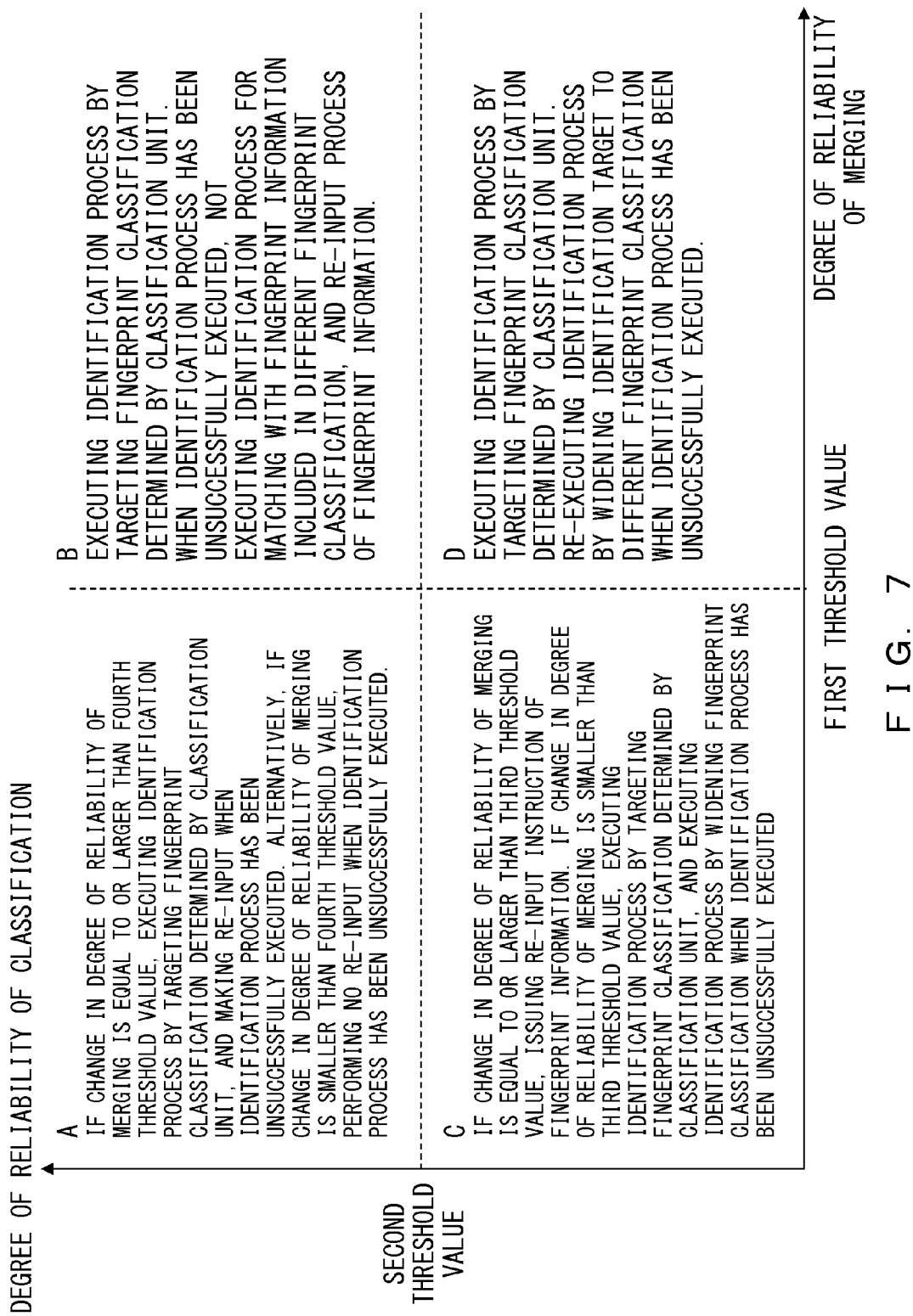
FIG. 7 illustrates a summary of analysis results obtained by a reliability degree analysis unit in the form of a table.

FIG. 7 illustrates a summary of analysis results obtained by the reliability degree analysis unit 16 in the form of a table. In the above described case, the degree of reliability of merging is equal to or larger than the first threshold value, and also the degree of reliability of classification is equal to or larger than the second threshold value, and an analysis result in this case is content written in Area B illustrated in FIG. 7. Accordingly, the identification control unit 4 initially executes an identification process by targeting a fingerprint classification determined by the classification unit 13 on the basis of the analysis result of the reliability degree analysis unit 16.

This process is an identification process that the identification unit 5 executes to compare with fingerprint information registered to the registration data storage unit 8 according to an instruction from the identification control unit 4. For example, if the classification unit 13 determines that a fingerprint classification is a "whorl pattern", corresponding fingerprint information is read from the registration data storage unit 8 and the identification process is executed. For instance, in the example illustrated in FIG. 2, fingerprint information of users having ID numbers "0001", "0003", "0005", . . . , included in the fingerprint classification "whorl pattern", are sequentially read from the registration data storage unit 8 and the identification process is executed. Also if the fingerprint classification determined by the classification unit 13 is a different classification, corresponding fingerprint information of users included in the fingerprint classification are sequentially read similarly, and the identification process is executed.

If the identification has been successfully performed as a result of the above described identification process, information indicating that the identification has been successfully performed is reported from the notification unit 7 to the user as described above. If the identification process has been unsuccessfully executed, information indicating that the identification has been unsuccessfully performed is reported to the user, and the re-input process and the identification process for matching with fingerprint information included in a different fingerprint classification are not executed. By executing the processes in this way, a processing time can be reduced.

The processes are performed as above because the input state of the fingerprint information is satisfactory and a possibility that a different person will be erroneously identified as a target person is increased when the identification process is repeated. Moreover, by executing the processes in this way, a load imposed on the biometric authentication device 1 can be lightened and also the processing time can be reduced.

Next, if the degree of reliability of classification is smaller than the second threshold value ("NO" in S9-2) even though the degree of reliability of merging is equal to or larger than the first threshold value ("YES" in S9-1), the reliability degree analysis unit 16 transmits, to the identification control unit 4, an analysis result indicating that the authentication process is to be continued by widening an identification target to a different fingerprint classification after the identification process has been executed and the identification process has been unsuccessfully executed (S9-4). This analysis result corresponds to Area D illustrated in FIG. 7. Since the merged input state is satisfactory in this case, this is an analysis result indicating that the identification process for performing matching with registration data belonging to the different fingerprint classification is to be executed by widening the range of the identification process.

For instance, in the example illustrated in FIG. 2, if a classification result indicating that the fingerprint classification is a "whorl pattern" is obtained by the classification unit 13, corresponding fingerprint information of users in the fingerprint classification are sequentially read, and the identification process is executed. If the identification process for performing matching with this fingerprint information has been unsuccessfully executed, the authentication process is executed by widening an identification target to a different fingerprint classification. The identification process is executed, for example, by widening the range to fingerprint information included in the different fingerprint classifications, such as "left loop pattern", "right loop pattern", or the like.

If the identification has been successfully performed as a result of the above described identification process, information indicating that the identification has been successfully performed is reported from the notification unit 7 to the user as described above. In contrast, if the identification process has been unsuccessfully executed, a notification indicating that the identification has been unsuccessfully performed is reported to the user, and an additional re-input instruction for the fingerprint information is not issued.

In this case, since the degree of reliability of classification of the fingerprint is low even though the degree of reliability of merging of the fingerprint is satisfactory, a binning error can possibly occur. To avoid this, the identification process for performing matching with the fingerprint information included in the different fingerprint classification is also executed. Moreover, the re-input process is not executed, whereby a load imposed on a user can be lightened.

Alternatively, if the degree of reliability of merging is smaller than the first threshold value ("NO" in S9-1) and the degree of reliability of classification is equal to or larger than the second threshold value ("YES" in S9-5), the analysis result corresponds to Area A illustrated in FIG. 7. In this case, whether or not a change in the degree of reliability of merging is equal to or larger than a fourth threshold value is further determined (S9-6). If the change in the degree of reliability of merging is equal to or larger than the fourth threshold value ("YES" in S9-6), the identification control unit 4 issues an identification process instruction, and issues a re-input instruction for the fingerprint information after the identification process has been unsuccessfully executed (S9-7). Alternatively, if the change in the degree of reliability of merging is smaller than the fourth threshold value ("NO" in S9-6), the identification control unit 4 issues an identification process instruction, and does not issue the re-input instruction for the fingerprint information after the identification process has unsuccessfully executed (S9-8).

Namely, if the change in the degree of reliability of merging is equal to or larger than the fourth threshold value ("YES" in S9-6), the identification control unit 4 issues the identification process instruction by targeting a fingerprint classification obtained by the classification unit 13. If the identification process has been unsuccessfully executed, the identification control unit 4 issues the re-input instruction for the fingerprint information without widening the process to a different fingerprint classification. In the above described first determination (S9-6), however, the merging process of the fingerprint information was not executed, and also the change in the degree of reliability of merging cannot be calculated. Therefore, the identification control unit 4 issues the re-input instruction for the fingerprint information.

Figure 8A:
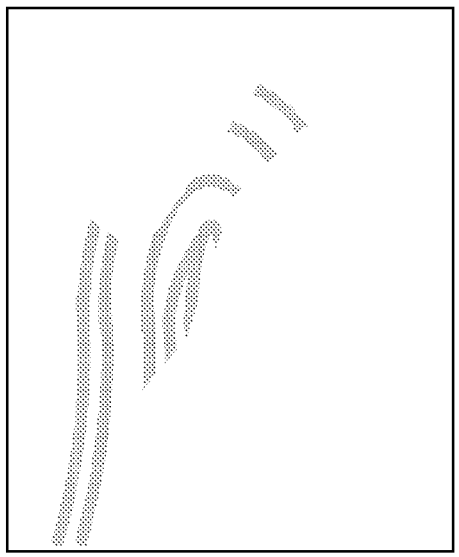
FIG. 8 illustrates a state where a pattern of a fingerprint after being merged changes as a result of a re-input process of fingerprint information, (a) illustrates a pattern of the fingerprint based on fingerprint information input the first time, (b) illustrates a pattern of the fingerprint input the second time, (c) illustrates a pattern of the fingerprint obtained by merging the fingerprint information input the first time and the second time.
Figure 8B:
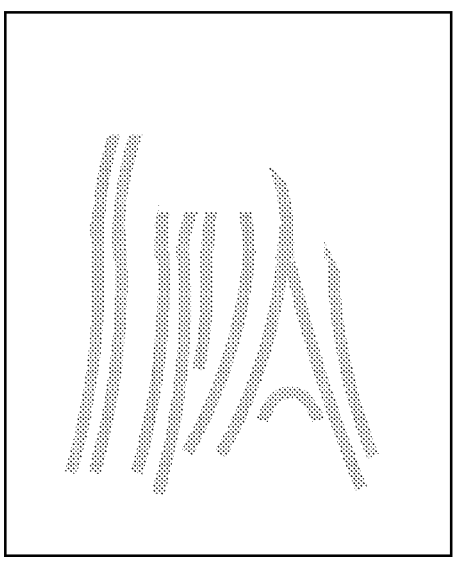
Figure 8C:
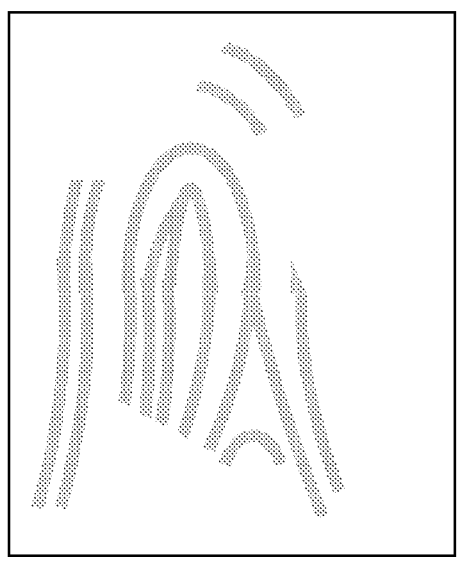

FIGS. 8(a) to 8(c) illustrate a change in fingerprint information after being merged as a result of the re-input process of the fingerprint information. A pattern of the fingerprint illustrated in FIG. 8(a) is based on, for example, the first fingerprint information, and information of only an upper left portion of the fingerprint is obtained. Accordingly, assuming that a pattern of the fingerprint illustrated in FIG. 8(b) is obtained after the re-input instruction has been issued, a merging result obtained by the merging unit 10 is a pattern of the fingerprint illustrated in FIG. 8(c).

For example, if the change in the degree of reliability of merging is equal to or larger than the above described fourth threshold value in comparison with the preceding time when the change in the degree of reliability of merging is calculated by the reliability degree analysis unit 16 in the above described re-input process, the identification process is executed within a range of the same fingerprint classification, and the re-input process is repeated. In contrast, if the change in the degree of reliability of merging is smaller than the fourth threshold value after the re-input process of the fingerprint information has been executed, and if the identification process in the range of the same fingerprint classification has been unsuccessfully executed, the re-input process of the fingerprint information is not executed.

Namely, by executing the processes in this way, a risk that for example a different person will be erroneously authenticated as a target person can be avoided without widening a process range of the identification process up to fingerprint information included in a different fingerprint classification. Moreover, an unnecessary re-input process is not executed, whereby a load imposed on the biometric authentication device can be lightened.

Lastly, if the degree of reliability of merging is smaller than the first threshold value ("NO" in S9-1) and also the degree of reliability of classification is smaller than the second threshold value ("NO" in S9-5), the analysis result corresponds to Area C illustrated in FIG. 7. In this situation, both the degree of reliability of merging and the degree of reliability of classification are low.

In this case, whether or not the change in the degree of reliability of merging is equal to or larger than the third threshold value is determined (S9-9). If the degree of reliability of merging is equal to or larger than the third threshold value ("YES" in S9-9), the identification control unit 4 issues a re-input instruction for the fingerprint information without issuing an identification process instruction (S9-10). In this case, the possibility that the identification will be successfully performed is low even if the identification process is executed, and the re-input instruction for the fingerprint information is immediately issued. However, also in this case, the merging process of the fingerprint information is not executed in the first determination (S9-9), and also the change in the degree of reliability of merging cannot be calculated. Therefore, the re-input instruction for the fingerprint information is issued.

Thereafter, while the degree of reliability of merging is improved as a result of the re-input process and the change in the degree of reliability of merging is equal to or larger than the third threshold value ("YES" in S9-9), the re-input instruction is repeated (S9-10).

Figure 10:
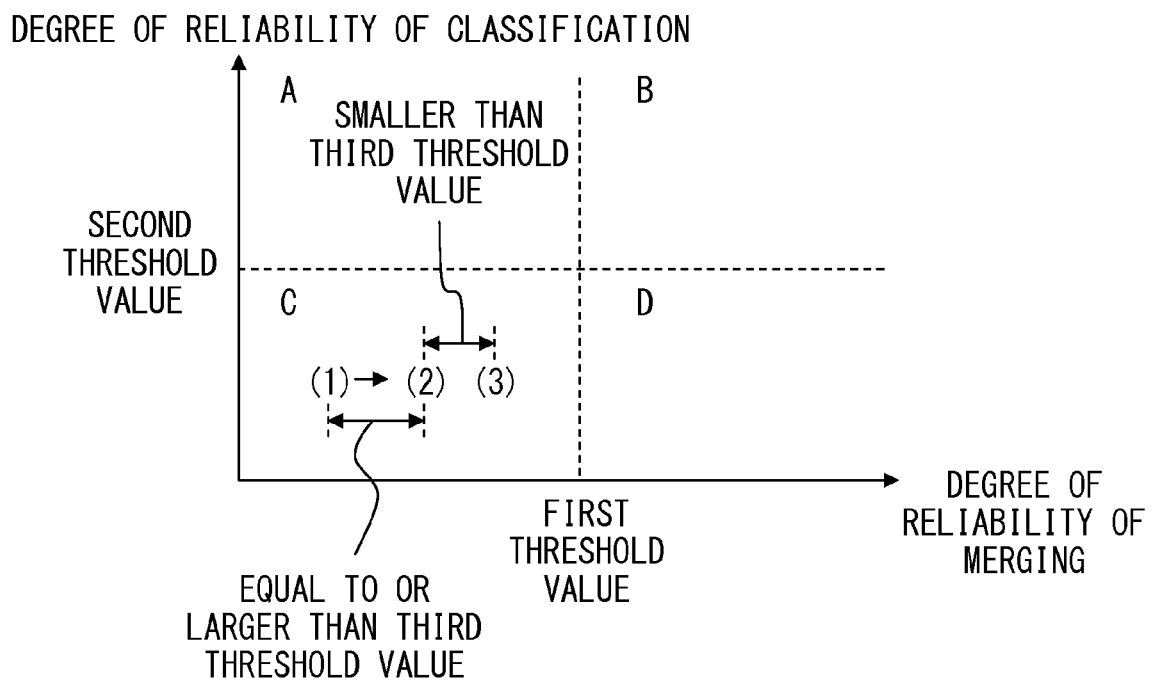
FIG. 10 illustrates an example where the degree of reliability of merging changes when a re-input instruction is issued and the degree of reliability of merging is not significantly changed.

FIGS. 9 and 10 illustrate the change in the degree of reliability of merging when the above described re-input instruction is issued. Initially, an example illustrated in FIG. 9 is a case where a level of fingerprint information input at the first time is at a position (1) illustrated in FIG. 9, and a level of the fingerprint information input at the second time is increased to a position (2) illustrated in FIG. 9 after the re-input instruction for the fingerprint information has been issued. In this case, the reliability degree analysis unit 16 analyzes that the change in the degree of reliability of merging is equal to or larger than the third threshold value and a re-input instruction is again issued.

In the meantime, an example illustrated in FIG. 10, as illustrated in FIG. 9, is a case where the level of fingerprint information input at the first time is at a position (1), the re-input instruction for fingerprint information is issued, the degree of reliability of merging is increased to the third threshold value or larger as a result of the fingerprint information input at the second time, the level changes to a position (2) illustrated in FIG. 10, and the change in the degree of reliability of merging is shifted to a position (3), which is smaller than the third threshold value as a result of further executing the re-input process ("NO" in S9-9).

In this case, the probability is low that the degree of reliability of merging will be increased even though the re-input process is further executed. Therefore, the identification process is executed without issuing the re-input instruction, and is further executed by widening the range of fingerprint information to the fingerprint information of a different fingerprint classification if the identification process has been unsuccessfully executed (S9-11). Namely, in this case, the identification process is continued by widening the range of a fingerprint classification, so that a binning error is avoided.

As described above, in this embodiment, whether or not to execute an identification process and whether a re-inputting of fingerprint information is needed are determined on the basis of the degree of reliability of merging and the degree of reliability of classification of input fingerprint information. As a result, an unnecessary identification process executed by widening a classification range can be prevented from being repeated, erroneous identification of a different person as a target person can be avoided, and a load imposed on the biometric authentication device can be prevented from being increased by an unnecessary re-input instruction.

Namely, if the degree of reliability of classification is satisfactory, an erroneous identification such that a different person is erroneously identified as a target person can be avoided without executing an unnecessary identification process by widening a fingerprint classification. Moreover, if the degree of reliability of merging is satisfactory, a burden imposed on a user can be lightened without issuing an unnecessary re-input instruction. Moreover, if the degree of reliability of classification is not satisfactory, the identification process is executed by widening a range of a fingerprint classification, so that a binning error can be avoided. Moreover, a load imposed on the biometric authentication device can be lightened by reducing the number of unnecessary identification processes and re-input processes.

This embodiment refers to the example of a fingerprint as biometric information input to the biometric information input unit 2. However, this embodiment can be similarly implemented when biometric information such as a vein, an iris of an eyeball, a blood vessel pattern of the back of the hand, or the like is used as the biometric information.

Additionally, the examples of "whorl pattern", "right loop pattern", "left loop pattern", and "arch pattern" are described as fingerprint classifications. However, a fingerprint may be classified by including other fingerprint classifications such as "plain arch pattern", "tented arch pattern", "accidental pattern", and the like.

Furthermore, in this embodiment, the fingerprint classification made by the classification unit 13 is decided on the basis of a central point of a fingerprint, a position of a delta of a fingerprint, a direction of a ridge of a fingerprint, and the like. However, the fingerprint classification may be decided by using feature information other than the above described feature information.

Figure 11:
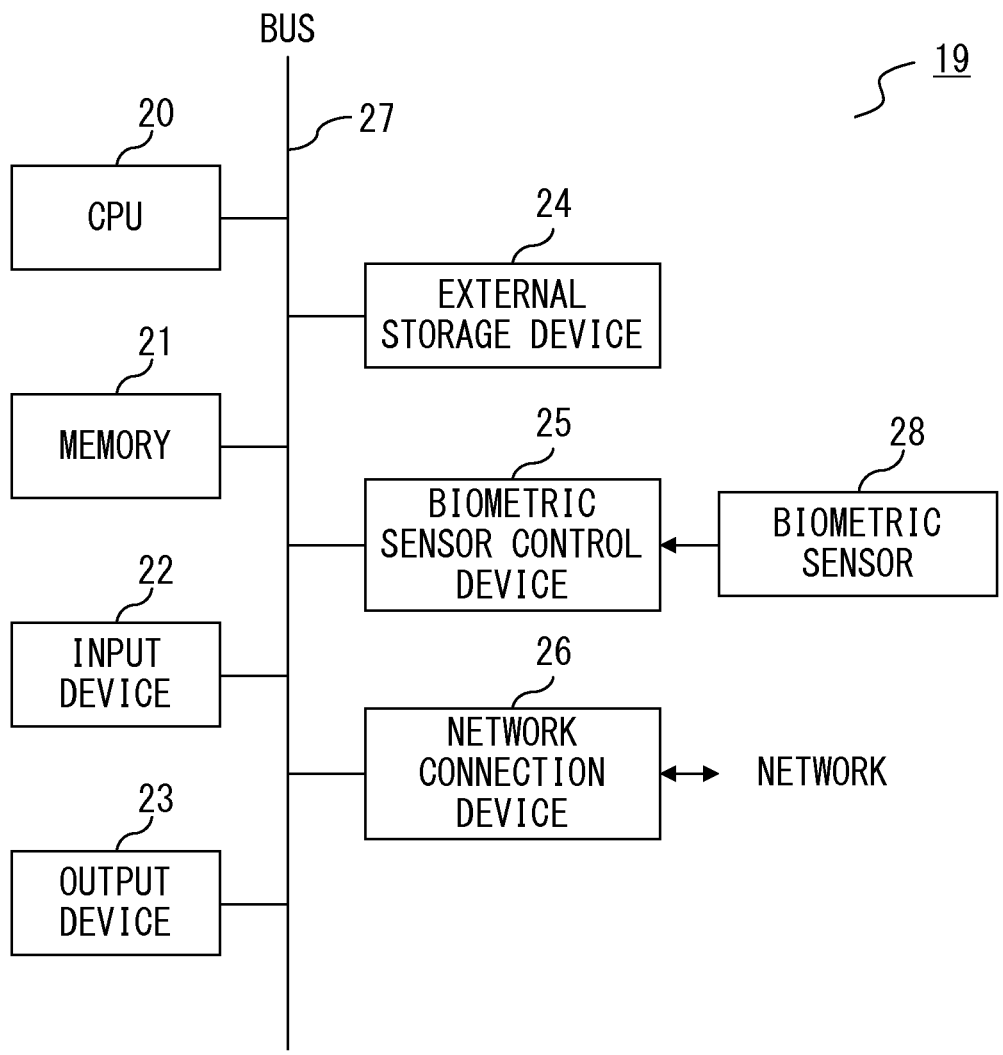
FIG. 11 is a diagram illustrating a system of an information processing device.

In addition, the biometric authentication device 1 illustrated in FIG. 1 can be also implemented, for example, by using an information processing device (computer) 19 illustrated in FIG. 11. The information processing device 19 illustrated in FIG. 11 includes a CPU 20, a memory 21, an input device 22, an output device 23, an external storage device 24, a biometric sensor control device 25, and a network connection device 26. These components are interconnected by a bus 27.

The memory 21 includes, for example, a ROM (Read Only Memory), a RAM (Random Access Memory) and the like, and stores a program and data, which are used for processes. The program stored in the memory 21 includes a program for executing the above described biometric authentication process illustrated in FIG. 3, the classification process illustrated in FIG. 5, and the reliability degree analysis process illustrated in FIG. 6. Moreover, the data stored in the memory 21 includes data of the above described first to fourth threshold values. The CPU 20 executes the biometric authentication process by using the program stored in the memory 21. When executing this process, the CPU 20 reads and uses the data of the above described first to fourth threshold values.

The input device 22 is, for example, a keyboard, a pointing device such as a mouse or the like, and is used to input an instruction or information of a user. Moreover, the output device 23 is, for example, a display, a printer or the like, and is used to display an inquiry to a user, or a process result.

The external storage device 24 is, for example, a magnetic disk device, an optical disk device, a magnetic tape device or the like. In the external storage device 24, the above described program and data are stored. The program and data are loaded into the memory 21 and used when needed.

The biometric sensor control device 25 performs an input control of biometric information such as fingerprint information or the like input from the biometric sensor 28, and transmits the biometric information to the CPU 20 or the like.

The network connection device 26 is connected to a communication network such as a LAN (Local Area Network) or the like, and performs data conversion accompanying a communication. Moreover, when needed, the information processing device 19 receives a program and data from an external device via the network connection device 26, and loads the program and the data into the memory 21 and uses them.

Figure 12:
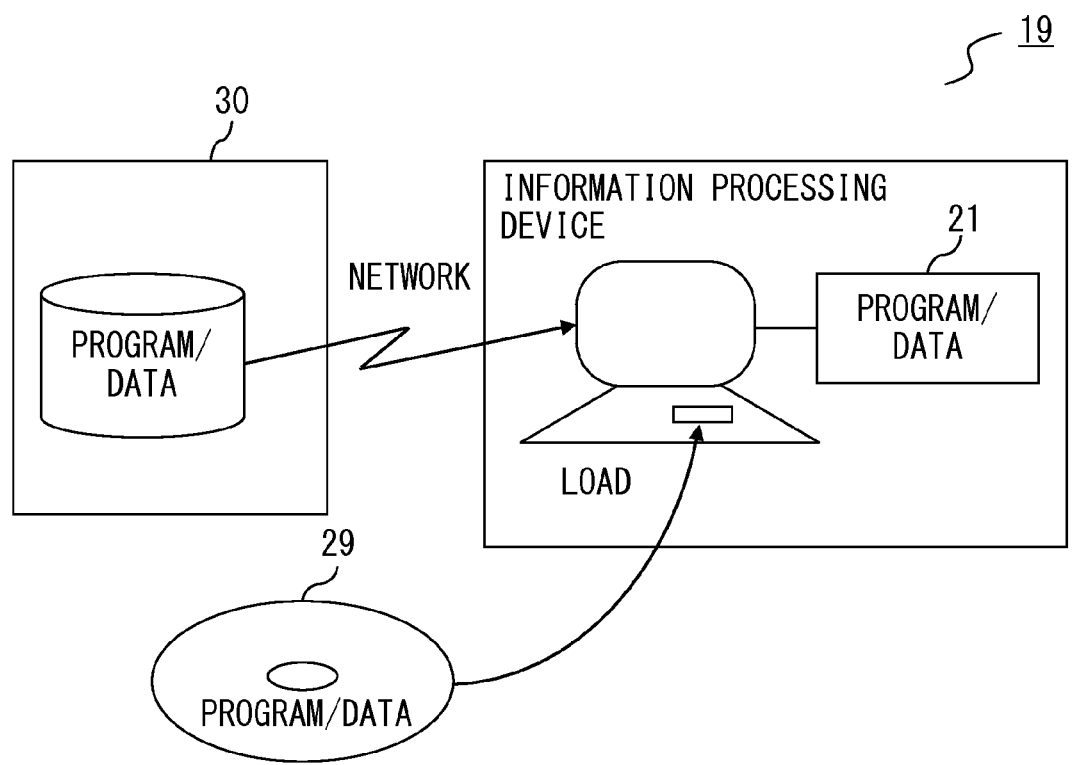
FIG. 12 illustrates methods for providing a program and data.

FIG. 12 illustrates methods for providing a program and data to the above described information processing device 19 illustrated in FIG. 11. The program and the data, which are stored, for example, in a database 29 of the external storage device 24, are loaded into the memory 21 of the information processing device 19. Alternatively, the external device 30 generates a propagation signal for propagating the program and the data, and transmits the generated signal to the information processing device 19 via an arbitrary transmission medium on a communication network. The CPU 20 executes the biometric authentication process by executing the program obtained with any of the above described methods with the use of the data.

EXPLANATION OF CODES

1 biometric authentication device
2 biometric information input unit
3 biometric data generation control unit
4 identification control unit
5 identification unit
6 target person determination unit
7 notification unit
8 registration data storage unit
8a user name storage unit
8b ID number storage unit
8c classification storage unit
8d link destination address storage unit
8e registration area
10 merging unit
11 information retention unit
11a, 11b storage area
12 feature extraction unit
13 classification unit
14 merging reliability degree calculation unit
15 classification reliability degree calculation unit
16 reliability degree analysis unit
18 biometric information
19 information processing device
20 CPU
21 memory
22 input device
23 output device
24 external storage device
25 biometric sensor control device
26 network connection device
27 bus
28 biometric sensor
29 database
30 external device

The invention claimed is:
1. A biometric authentication device comprising:
an input device providing a biometric information input unit configured to input biometric information;
a storage providing a retention unit configured to retain the biometric information input from the biometric information input unit;
a processor providing
a merging unit configured to merge new biometric information input from the biometric information input unit and the biometric information retained in the retention unit;
a feature extraction unit configured to extract feature information of the biometric information input from the biometric information input unit, or feature information of biometric information merged by the merging unit;
a classification unit configured to classify the biometric information on the basis of the feature information extracted by the feature extraction unit;

a merging reliability degree calculation unit configured to calculate a degree of reliability of the biometric information input from the biometric information input unit, or a degree of reliability of the biometric information merged by the merging unit;

a classification reliability degree calculation unit configured to calculate a degree of reliability of classification of the biometric information classified by the classification unit;

a control unit configured to analyze the degree of reliability of biometric information on the basis of the degree of reliability of merging and the degree of reliability of classification, and to issue a re-input instruction for the biometric information or an identification process instruction for performing matching with biometric information prestored in a storage unit in accordance with whether the degree of reliability of merging is equal to or larger than a specified threshold value or smaller than the specified threshold value, and whether the degree of reliability of classification is equal to or larger than a specified threshold value or smaller than the specified threshold value;

an identification unit configured to execute the identification process for performing matching with the biometric information stored in the storage unit according to the identification process instruction issued by the control unit; and a notification unit configured to notify a user of the re-input instruction according to the re-input instruction issued by the control unit.

2. The biometric authentication device according to claim 1, wherein the feature information is retained by the retention unit, is output to the feature extraction unit when the merging process of the biometric information is executed by the merging unit, and used for an extraction process of the feature information by the feature extraction unit.

3. The biometric authentication device according to claim 2, wherein biometric information belonging to each classification is stored in the storage unit for each classification obtained by the classification unit.

4. The biometric authentication device according to claim 3, wherein the control unit issues an instruction to read, from the storage unit, the biometric information belonging to the classification obtained by the classification unit and to execute the identification process when the degree of reliability of merging output from the merging reliability degree calculation unit is equal to or larger than a first threshold value and the degree of reliability of classification output from the classification reliability degree calculation unit is equal to or larger than a second threshold value, and does not issue an identification process instruction for biometric information that is stored in the storage unit and belongs to a classification other than the classification obtained by the classification unit, or the re-input instruction for the biometric information when the identification process has been unsuccessfully executed.

5. The biometric authentication device according to claim 4, wherein the biometric information input from the biometric information input unit is a fingerprint, feature information of the fingerprint is extracted by the feature extraction unit, and the fingerprint is classified by the classification unit.

6. The biometric authentication device according to claim 3, wherein the control unit issues an instruction to read, from the storage unit, the biometric information belonging to the classification obtained by the classification unit and to execute the identification process when the degree of reliability of merging output from the merging reliability degree calculation unit is equal to or larger than a first threshold value and the degree of reliability of classification output from the classification reliability degree calculation unit is smaller than a second threshold value, and issues an identification process instruction for biometric information that is stored in the storage unit and that belongs to a classification other than the classification obtained by the classification unit, and does not issue the re-input instruction for the biometric information when the identification process has been unsuccessfully executed.

7. The biometric authentication device according to claim 6, wherein the biometric information input from the biometric information input unit is a fingerprint, feature information of the fingerprint is extracted by the feature extraction unit, and the fingerprint is classified by the classification unit.

8. The biometric authentication device according to claim 3, wherein the control unit issues an instruction to read, from the storage unit, the biometric information belonging to the classification obtained by the classification unit and to execute the identification process when the degree of reliability of merging output from the merging reliability degree calculation unit is smaller than a first threshold value and the degree of reliability of classification output from the classification reliability degree calculation unit is equal to or larger than a second threshold value, and issues the re-input instruction when the identification process has been unsuccessfully executed.

9. The biometric authentication device according to claim 8, wherein the merging process is executed by the merging unit for the biometric information input from the biometric information input unit according to the re-input instruction, an additional re-input instruction is issued when a change in the degree of reliability of merging after the merging process is equal to or larger than a fourth threshold value, an instruction to read, from the storage unit, the biometric information belonging to the classification obtained by the classification unit and to execute the identification process is issued when the change in the degree of reliability of merging after the merging process is smaller than the fourth threshold value, and an additional re-input instruction is not issued when the identification process has been unsuccessfully executed.

10. The biometric authentication device according to claim 9, wherein the biometric information input from the biometric information input unit is a fingerprint, feature information of the fingerprint is extracted by the feature extraction unit, and the fingerprint is classified by the classification unit.

11. The biometric authentication device according to claim 8, wherein the biometric information input from the biometric information input unit is a fingerprint, feature information of the fingerprint is extracted by the feature extraction unit, and the fingerprint is classified by the classification unit.

12. The biometric authentication device according to claim 3, wherein the control unit issues the re-input instruction when the degree of reliability of merging output from the merging reliability degree calculation unit is smaller than a first threshold value and the degree of reliability of classification output from the classification reliability degree calculation unit is smaller than a second threshold value.

13. The biometric authentication device according to claim 12, wherein the merging process is executed by the merging unit for the biometric information input from the biometric information input unit according to the re-input instruction, an additional re-input instruction for the biometric information is issued when a change in the degree of reliability of merging after the merging process is equal to or larger than a third threshold value, an identification process instruction for the biometric information belonging to the classification obtained by the classification unit is issued when the change in the degree of reliability of merging after the merging process is smaller than the third threshold value, and an identification process instruction for biometric information belonging to a classification other than the classification obtained by the classification unit is issued when the identification process has been unsuccessfully executed.

14. The biometric authentication device according to claim 13, wherein the biometric information input from the biometric information input unit is a fingerprint, feature information of the fingerprint is extracted by the feature extraction unit, and the fingerprint is classified by the classification unit.

15. The biometric authentication device according to claim 12, wherein the biometric information input from the biometric information input unit is a fingerprint, feature information of the fingerprint is extracted by the feature extraction unit, and the fingerprint is classified by the classification unit.

16. The biometric authentication device according to claim 3, wherein the biometric information input from the biometric information input unit is a fingerprint, feature information of the fingerprint is extracted by the feature extraction unit, and the fingerprint is classified by the classification unit.

17. The biometric authentication device according to claim 2, wherein the biometric information input from the biometric information input unit is a fingerprint, feature information of the fingerprint is extracted by the feature extraction unit, and the fingerprint is classified by the classification unit.

18. The biometric authentication device according to claim 1, wherein the biometric information input from the biometric information input unit is a fingerprint, feature information of the fingerprint is extracted by the feature extraction unit, and the fingerprint is classified by the classification unit.

19. A biometric authentication method comprising:
inputting biometric information;
retaining the biometric information input from the inputting;
merging biometric information newly input by the inputting and the biometric information retained in the retaining;
extracting feature information of the biometric information input by the inputting, or feature information of biometric information merged by the merging;
classifying the biometric information on the basis of the feature information extracted by the extracting;
calculating a degree of reliability of the biometric information input by the inputting, or a degree of reliability of biometric information merged by the merging;
calculating a degree of reliability of classification of the biometric information classified by the classifying;
performing a control for analyzing the degree of reliability of biometric information on the basis of the degree of reliability of merging and the degree of reliability of classification, and for issuing a re-input instruction for the biometric information or an identification process instruction for performing matching with biometric information prestored in a storage unit in accordance with whether the degree of reliability of merging is equal to or larger than a specified threshold value or smaller than the specified threshold value, and whether the degree of reliability of classification is equal to or larger than a specified threshold value or smaller than the specified threshold value;
executing the identification process according to the instruction; and
notifying a user of the re-input instruction according to the re-input instruction.

20. A non-transitory computer-readable recording medium having stored therein a biometric authentication program for causing a computer to execute processes comprising:
inputting biometric information;
retaining the biometric information input from the inputting;
merging biometric information newly input by the inputting and the biometric information retained in the retaining;
extracting feature information of the biometric information input by the inputting, or feature information of biometric information merged by the merging;
classifying the biometric information on the basis of the feature information extracted by the extracting;
calculating a degree of reliability of the biometric information input by the inputting, or a degree of reliability of biometric information merged by the merging;
calculating a degree of reliability of classification of the biometric information classified by the classifying;
performing a control for analyzing the degree of reliability of biometric information on the basis of the degree of reliability of merging and the degree of reliability of classification, and for issuing a re-input instruction for the biometric information or an identification process instruction for performing matching with biometric information prestored in a storage unit in accordance with whether the degree of reliability of merging is equal to or larger than a specified threshold value or smaller than the specified threshold value, and whether the degree of reliability of classification is equal to or larger than a specified threshold value or smaller than the specified threshold value;
executing the identification process according to the instruction; and
notifying a user of the re-input instruction according to the re-input instruction.

* * * * *

UNITED STATES PATENT AND TRADEMARK OFFICE
CERTIFICATE OF CORRECTION

| | |
|---|---|
| PATENT NO. | : 9,092,655 B2 |
| APPLICATION NO. | : 13/927922 |
| DATED | : July 28, 2015 |
| INVENTOR(S) | : Kazuya Uno et al. |

It is certified that error appears in the above-identified patent and that said Letters Patent is hereby corrected as shown below:

In the Specification

Column 1, Line 2

Above "TECHNICAL FIELD" insert

-- CROSS-REFERENCE TO RELATED APPLICATIONS

This application is a continuation application of International Application No. PCT/JP2010/073634 filed on December 27, 2010 and designating the U.S., the entire contents of which are incorporated herein by reference. --.

Signed and Sealed this
Twenty-seventh Day of October, 2015

Michelle K. Lee
*Director of the United States Patent and Trademark Office*